Nov. 3, 1925.  1,560,310
C. PFANSTIEHL ET AL
GRID LEAK CONDENSER
Filed Jan. 2, 1924
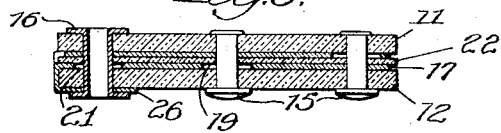
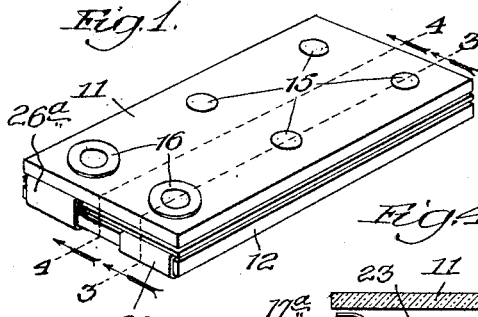
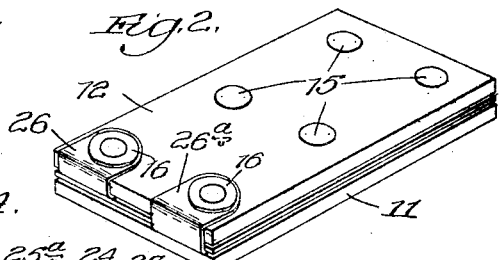
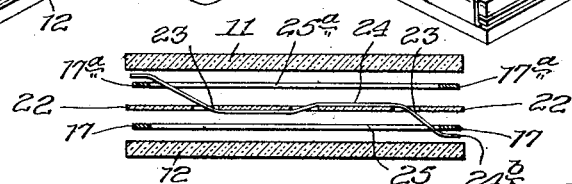
Inventors:
Carl Pfanstiehl,
William Oscar Bell,
By Byrneforth, Lee, Britton & Wiles
Attys.

Patented Nov. 3, 1925.

1,560,310

UNITED STATES PATENT OFFICE.

CARL PFANSTIEHL AND WILLIAM OSCAR BELL, OF HIGHLAND PARK, ILLINOIS, ASSIGNORS TO PFANSTIEHL RADIO COMPANY, OF HIGHLAND PARK, ILLINOIS, A CORPORATION OF ILLINOIS.

GRID-LEAK CONDENSER.

Application filed January 2, 1924. Serial No. 683,952.

*To all whom it may concern:*

Be it known that we, CARL PFANSTIEHL and WILLIAM OSCAR BELL, citizens of the United States, residing at Highland Park, in the county of Lake and State of Illinois, have invented a new and useful Improvement in Grid-Leak Condensers, of which the following is a specification.

This invention relates to electrical condensers and more particularly to a combined condenser and high resistance or leak which is adapted to be used in a grid circuit of radio receiving sets. The invention is fully described in the following specification and shown in the accompanying drawings in which:

Figures 1 and 2 are top and bottom perspective views of condensers embodying the invention;

Fig. 3 is a longitudinal section on the line 3 of Fig. 1;

Fig. 4 is a longitudinal section on the line 4 of Fig. 1, showing the parts as separated previous to assembling;

Figs. 5 and 6 are front elevations of the top and bottom covers;

Fig. 7 is a front elevation of the central sheet of insulation showing a grid leak mounted therein;

Figs. 8 and 9 are front elevations of the two metallic plates shown in the relative positions in which they appear in the assembled condenser, and Fig. 10 is a view similar to Fig. 4 but showing a modified form of the device in which the grid leak is made variable at the time of assembling the condenser.

The condenser illustrated comprises top and bottom covers 11 and 12 of any suitable insulating material as bakelite, formica or the like, in which are formed four similarly spaced holes 13 and two larger holes 14, the former being adapted to snugly fit around rivets 15 while the latter are adapted to receive the hollow rivets 16.

The lower metallic plate 17 is placed over the rivets 15, the holes 18 therein snugly fitting around these rivets, while the larger holes 19 are spaced from the diagonally opposite pair of rivets 15 so as not to make contact therewith, as shown in Fig. 3. At the same time the hole 21 snugly fits one of the hollow rivets 16 while the opening 20 being larger, is spaced from the other rivet 16 at some distance.

The metallic condenser plate $17^a$ is identical with the plate 17 but is reversed so that the small openings $18^a$ and $21^a$ snugly fit around the three rivets of the condenser which are spaced some distance from the larger openings of the plate 17, while the larger openings $19^a$ and $20^a$ are likewise spaced from the rivets which guide and securely hold the plate 17.

Between these plates is placed a sheet of mica 22 or other suitable insulating material, in which is placed a series of holes 23 through which is threaded a strip of carbon impregnated paper 24 or the like, which is adapted to serve as a high resistance or leak between the terminals of the condenser. The strip 24 is placed longitudinally over the sheet of mica 22 and in the center thereof and longitudinal openings 25 and $25^a$ are placed in the condenser plates 17 and $17^a$ respectively and these register with the strip 24 throughout the greater part of its length. At the ends $24^a$ and $24^b$ however, it is carried up over the ends of the plates 17 and $17^a$ so as to make contact therewith on the outer surface of these plates.

With the parts loosely assembled upon the rivets in the position shown in Fig. 4, pressure is applied to the covers 11 and 12 and the rivets are set and the ends riveted over. Prior to riveting over the end of the hollow rivets 16, ears 26 and $26^a$ are bent back over the top cover 12 and passed under these rivets which are then riveted over as shown in Fig. 3.

In assembling the leak in the condenser as has been previously described, it is very necessary that the ends $24^a$ and $24^b$ of the carbon strip be placed outside the plates 17 and $17^a$ as shown in Fig. 4. If placed between these plates instead of outside of them, this resistance element will be in the electro-static field which exists between these plates, and the efficiency of the condenser will be greatly impaired.

In Fig. 10 is shown a modified form of the device in which the mica insulating sheet 27 is provided with a single opening 28 through which passes the strip 29 forming a grid leak. A narrow strip of metal 30 is then placed over one end of the strip 29 and by moving the metallic strip 30 back and forth, a variable grid leak is obtained. This is accomplished by riveting one end of the condenser while the other is left open sufficiently to permit the metal strip to be moved back and forth and if desired, the resistance of the grid leak may be read at the same time so that by moving the strip 30 back and forth a grid leak of any desired resistance may be obtained. The end of the metallic strip 30 protruding from beneath the cover, is then cut off, and the condenser closed and riveted.

The plurality of holes 23 in the insulation strip 22 provides a convenient method of assembling since the resistance strip 24 is readily inserted through these holes and friction holds it therein permitting the ends of the strips 24 to be pushed under the ends of the metal condenser plates.

In either of these forms the value of the grid leak may be fairly accurately determined by the known resistance of the sheet from which the grid leak is cut and from the width of the paper strip forming the grid leak.

While we have shown and described but two embodiments of our device, it is to be understood that it is capable of many modifications; changes therefore in the construction and arrangement may be made which do not depart from the spirit and scope of the invention as disclosed in the appended claims, in which it is our intention to cover all novelty inherent in the invention as broadly as possible, in view of the prior art.

What we claim as new and desire to secure by Letters Patent is:

1. In a condenser, similar plates alternately oppositely faced, holes in said plates, rivets snugly fitting said holes in the plates, oppositely placed holes in alternate plates larger than the first named holes and registering with the same, insulating material separating said plates, said insulation snugly fitting said rivets, central openings in two adjacent plates, and a grid leak extending across said openings and having its ends connected to said plates.

2. In a condenser, similar plates alternately oppositely faced, holes in said plates, rivets snugly fitting said holes in the plates, oppositely placed holes in alternate plates larger than the first named holes and registering with the same, insulating material separating said plates, said insulation snugly fitting said rivets, central openings in two adjacent plates, and a grid leak extending across said openings, the ends of said leak making contact with said plates outside the electro-static field of said condenser.

3. In a condenser, similar plates alternately oppositely faced, holes in said plates, rivets snugly fitting said holes in the plates, oppositely placed holes in alternate plates larger than the first named holes and registering with the same, insulating material separating said plates, said insulation snugly fitting said rivets, central openings in two adjacent plates, and a grid leak extending across said openings, the ends of said leak being carried up over said plates and making contact with the sides of said plates facing away from the other plate.

4. In a condenser, similar plates alternately oppositely faced, holes in said plates, rivets snugly fitting said holes in the plates, oppositely placed holes in alternate plates larger than the first named holes and registering with the same, insulating material separating said plates, said insulation snugly fitting said rivets, central openings in two adjacent plates, and a grid leak extending across said openings, having its ends connected to said plates, and a metal strip slidable over said grid leak to vary the resistance of the same.

5. In a condenser, spaced condenser plates, a sheet of insulation between said plates, openings in said plates, and a grid leak passing through said openings, the ends of the grid leak making contact with said plates outside the electro-static field between said plates.

6. In a condenser, spaced condenser plates, a sheet of insulation between said plates, openings in said plates, a hole in said insulation registering with said openings, and a grid leak passing through said openings and hole, the ends of said grid leak being connected to said plates.

7. In a condenser, spaced condenser plates, a sheet of insulation between said plates, openings in said plates, holes in said insulation registering with said openings, and a grid leak passing through said openings and holes, the ends of said grid leak being connected to said plates.

In witness whereof we have hereunto set our hands and seals this 29th day of December 1923.

CARL PFANSTIEHL.
WILLIAM OSCAR BELL.